(12) United States Patent
Teasdale et al.

(10) Patent No.: US 8,608,485 B2
(45) Date of Patent: Dec. 17, 2013

(54) INTERACTIVE MANAGEMENT SYSTEM FOR DEVELOPING INSTRUCTIONAL MULTIMEDIA AND CURRICULUM DELIVERY SYSTEMS

(75) Inventors: Michael Peter Teasdale, Golden, CO (US); Matthew J. Fackelman, Colorado Springs, CO (US)

(73) Assignee: ITREE Group LLC, Golden, CO (US)

( * ) Notice: Subject to any disclaimer, the term of this patent is extended or adjusted under 35 U.S.C. 154(b) by 685 days.

(21) Appl. No.: 12/778,434

(22) Filed: May 12, 2010

(65) Prior Publication Data

US 2010/0293041 A1 Nov. 18, 2010

Related U.S. Application Data

(60) Provisional application No. 61/177,424, filed on May 12, 2009.

(51) Int. Cl.
*G09B 11/00* (2006.01)

(52) U.S. Cl.
USPC .......................................... 434/365; 707/705

(58) Field of Classification Search
USPC ............ 434/118, 322, 323, 350, 365; 707/10, 707/705
See application file for complete search history.

(56) References Cited

U.S. PATENT DOCUMENTS

| | | | |
|---|---|---|---|
| 5,820,386 A | 10/1998 | Sheppard, II | |
| 6,190,178 B1 | 2/2001 | Oh | |
| 6,470,171 B1 | 10/2002 | Helmick et al. | |
| 6,769,010 B1 * | 7/2004 | Knapp et al. | 709/217 |
| 6,793,129 B2 | 9/2004 | Wood et al. | |
| 6,988,138 B1 | 1/2006 | Alcorn et al. | |
| 7,143,089 B2 | 11/2006 | Petras et al. | |
| 2003/0208397 A1 * | 11/2003 | VanDusen | 705/14 |
| 2004/0205645 A1 | 10/2004 | Hoffman | |
| 2004/0206809 A1 | 10/2004 | Wood et al. | |
| 2006/0047645 A1 | 3/2006 | Sagie | |
| 2007/0020604 A1 | 1/2007 | Chulet | |

(Continued)

FOREIGN PATENT DOCUMENTS

| | | |
|---|---|---|
| WO | WO 2004/021308 | 3/2004 |
| WO | WO 2010/132544 | 11/2010 |

OTHER PUBLICATIONS

International Search Report and Written Opinion, Corresponding to International Application No. PCT/US10/034507, Mailed Jul. 16, 2010.

(Continued)

*Primary Examiner* — Kathleen Mosser
(74) *Attorney, Agent, or Firm* — Lathrop & Gage LLP

(57) ABSTRACT

Provided are methods of making a learning application by providing a content database comprising reusable digital objects, wherein at least a portion of the objects are deposited to the content database by a registered contributor and the portion is identified as contributed by said registered contributor. A user is registered to provide the user access to the content database, wherein the user withdraws at least a portion of the objects from the database deposited by the registered contributor. The withdrawn object is formed into the learning application and a compensation value for the registered contributor who contributed the withdrawn object is calculated. In this manner, ongoing sustainable development of the content database is encouraged, including deposit of learning objects and development of instructional objects that can then be accessed by others in developing individually-tailored learning applications.

31 Claims, 11 Drawing Sheets

REUSABLE DIGITAL INSTRUCTIONAL OBJECTS DEFINED

(56) References Cited

U.S. PATENT DOCUMENTS

| | | |
|---|---|---|
| 2008/0228580 A1 | 9/2008 | Korman et al. |
| 2008/0313057 A1 | 12/2008 | Gooch et al. |
| 2009/0006413 A1* | 1/2009 | Andersen .................. 707/10 |
| 2009/0030897 A1 | 1/2009 | Hatami-Hanza |
| 2009/0263777 A1* | 10/2009 | Kohn ....................... 434/350 |

OTHER PUBLICATIONS

Kinetic Books—Digital Physics Textbook, http://www.kineticbooks.com/products/textbook.html , Downloaded Mar. 12, 2008.

Microsoft Office OneNote 2007 Product Overview, http://office.microsoft.com/en-us/onenote , Downloaded Mar. 12, 2008.

* cited by examiner

PAYMENT FLOW

MULTIPLE PAYMENT FLOW

REUSABLE DIGITAL LEARNING OBJECTS DEFINED

REUSABLE DIGITAL INSTRUCTIONAL OBJECTS DEFINED

INTERACTIVE MANAGEMENT SYSTEM FOR DEVELOPING INSTRUCTIONAL MULTIMEDIA AND CURRICULUM DELIVERY SYSTEMS

CROSS-REFERENCE TO RELATED APPLICATIONS

This application claims benefit of U.S. Provisional Patent Application 61/177,424 filed May 12, 2009, which is hereby incorporated by reference to the extent not inconsistent herewith.

BACKGROUND OF THE INVENTION

Provided are systems that address the need for development of instructional materials from a content database in an efficient, comprehensive and flexible manner. In particular, the system employs a content database that is refined and updated by system users, wherein users access the content database to develop, publish, license and deploy learning applications to others.

Generally, the instructional field, including educational settings, requires tools for learning. Those tools are broadly referred to as "learning applications". In a conventional application, this may be a textbook or other written material. In conventional settings, the learning application that is a written material suffers a disadvantage in that the written materials can be expensive and are generally not customizable. Accordingly, large sections of the written materials may not be of interest in a particular learning situation and, in fact, not be needed or even addressed in the instructional setting. This forces the instructor or supervisor of the instructional setting to either remove, or inform the learners to disregard, entire sections of material from the learning application.

In the educational setting, an individual teacher may remove material from a book or other resource and recreate their own documents, lesson plans, courses, etc., from the original source material(s). In other words, in a conventional setting a teacher may take a learning object in a printed format and restructure them to fit their own needs. This is, however, an expensive, time-consuming and rather limited process. In addition, the individual teacher has difficulty in leveraging the effort expended in modifying the learning object to a learning application to other teachers who would be interested in using the developed learning application.

There is a need in the field of instructional learning, such as in educational and industry settings, for learning/curriculum management and delivery systems that are flexible and broadly defined so that a large amount of content can be readily accessed, manipulated and tailored into a learning tool that is particularly well-suited for the application of interest.

Although tools are generally available for educators to employ in developing course content and learning evaluation, they suffer various disadvantage including limitations on development of the content database from which content is drawn and deployed. Conventional products and systems hinder collaborative contributions that can serve to continuously update and regulate the content database to provide the most valuable and user-friendly content database for a variety of learning applications. Accordingly, although instructors and instructional designers in education and industry fields may have access to a large collection of digital multimedia instructional resources, the organization for deployment of learning applications is hindered and constrained by the structure of those resources.

SUMMARY OF THE INVENTION

Provided herein is an interactive digital management system for developing, publishing, licensing and deploying instructional materials such as materials having a digital multimedia component. One application of the systems provided is for deploying learning applications from a content database, such as a content database that is continually accessed, updated, and developed by users of the system. In particular, the systems are designed to facilitate deposit of reusable digital objects that are then available by users, thereby making the entire system more valuable. The systems are particularly useful for a combination of one or more of managing, developing, and distributing reusable digital instructional and learning objects, including learning applications, from a central repository of information, specifically a content database.

One problem that is overcome by the systems provided herein is that the databases from which a learning application is developed is improperly structured, making it impossible or at least seriously difficult, to form a learning application that meets the criteria of a $21^{st}$ Century Learning Environment. Relevant criteria include a dynamic environment having concurrent and simultaneous evaluation and modification of the learning application. In such a situation, both the learner and the provider of the learning application can have input/evaluation resulting in continual and ongoing updates to the learning application, accommodating input from both the learner and the provider. Accordingly, the processes described herein for making a learning application rely on a content database comprising specially deposited and tagged Reusable Digital Objects (RDO), including Reusable Digital Instructional Objects (RDIO) that is Reusable Digital Learning Object (RDLO) Content and RDLO Process. Such a RDIO content database not only contains tagged and searchable content with contextual information, but also contains various process tools with contextual information. Accordingly, an aspect of the invention provides a single database where both the information needed to make the learning application (RDLO content) as well as the framework for how to present the information to the learner (RDLO process) are contained. In this manner, not only can the content be rapidly and efficiently changed, but the framework upon which the learning application is based (e.g., the learning process or the RDLO process) can also be rapidly and efficiently changed. Use of appropriate incentive systems provide a robust and rapidly evolving content database that is continuously updated with tagged RDLO Content and RDLO processes, in order to form RDIO.

Conventional instructional media is delivered in a constrained manner, wherein typically the learning application is fixed and the structure does not lend itself to modification by either the instructor or the learner. Although potential instructors or teachers have the ability to access a wide range of materials, how those materials can be modified and or disseminated is restricted. In addition, there is a substantial time lag having to do with acquisition of instructional media by conventional deployment systems and the rate of design of new learning applications using that instructional media. Disclosed herein are various processes to provide fully customizable instruction for any organizational needs that is both cost accessible and current, owing to the interactive nature of the system that implements the process. One objective of the processes and methods provided herein is to create and establish a sustainable digital management system that is particularly useful for developing, licensing, publishing and/or deploying learning applications, such as a learning application that is a digital multimedia instructional material. For example, an instructor is capable of managing all their instructional needs including, but not limited to, customizing a learning application for deployment or access by learners; standardizing multimedia to maximize instruction; ensuring development and/or delivery of material is compliant with a desired standard such as Sharable Content Object Reference Model (SCORM) or Common Cartridge, for example; ensuring access to instructional material or learning applications is cost effective and sustainable. In this manner, rather than the learning application being provided as fixed so that "you get what you get", the learning application is customizable and tailored so that "you get what you need."

Systems provided herein are suitable for use by any number of users or types of users. The user may be a commercial entity, or a representative thereof, for development and/or deployment of "in house" instructional objects such as training manuals and the like. The deployed learning application may be targeted to third parties such as individuals or other entities. Alternatively, the user may be an individual. Depending on the user's interest, the user may be: a consumer desiring to withdraw and/or deploy an object, such as an instructional object, from the content database; a contributor interested in placing an object into the content database for use by registered users, a developer who is both withdrawing an object from the content database and using the withdrawn object to develop an instructional object that is subsequently placed into the content database, or a publisher who is interested in deploying content in the content database to others.

In an aspect, the invention is a method of making a learning application that addresses the specific organization/leaner outcomes/goals by providing a content database. The content database comprises reusable digital objects, wherein at least a portion of the objects are deposited to the content database by a registered contributor and a deposited object is identified as contributed by the registered contributor. A user is registered, thereby providing the user with access to the content database and permission to withdraw objects from the database. The withdrawn contribution is formed into a learning application and a compensation value calculated for the registered contributor who deposited the withdrawn object. In an embodiment, the withdrawn object is the learning application.

The objects in the content database may be any content that would be of use to a user such as a learning object, an instructional object, a process object, or a combination thereof.

In an aspect, the user is a contributor, a developer, a consumer, a publisher or a combination thereof.

The content database comprises a plurality of reusable digital objects. In an aspect the reusable digital object is a learning object. Examples of reusable digital objects include, but are not limited to, one or more of an image; a flash animation; a textual entry; a lesson plan; a training manual or portion thereof; a textbook or portion thereof; or a combination thereof. In another aspect, the reusable digital object comprises a process object. In an aspect the process object is a process skill object that is used to develop or learn a skill. Examples of process objects include, but are not limited to, a dynamic calculator object; a behavior management object; a spell check object; a learning or a "how-to" tool; a scientific implementation tool; a taxonomical management tool; a staff management tool, rubric, a performance assessment tool or a "curriculum/learning theory template."

In another aspect, the learning application is selected from the group consisting of a publication; a textbook; a training manual; a course curriculum; a lesson plan; a webinar (e.g., a one-way web conference or webcast or a two-way interactive internet presentation), an interactive digital document and a process object, such as a process skill object. "Interactive digital document" refers to digital content that a learner actively engages, such as providing answers, and the interactive digital document provides additional information or inputs, feedback, and/or comments based on the inputs. Any of the methods provided herein optionally relate to displaying the learning application on a physical medium, such as a physical medium selected from the group consisting of paper and an electronic display.

In an embodiment, the methods provided herein further relate to removing objects from the database, wherein the removed objects are not sufficiently accessed. In an aspect, the method further comprises identifying a withdrawal number for an individual reusable digital object based on the number of times said object is withdrawn, and removing the reusable digital object from the database if the withdrawal number is less than a minimum withdrawal number. The minimum withdrawal number is provided by an administrator of the system or of the content database and can be a base withdrawal number, or a rate (e.g., withdrawal number over a certain time interval). An object that is not directly withdrawn, but instead is indirectly withdrawn such as when the object is incorporated into an instructional object that is then withdrawn may contribute to the withdrawal number.

In an embodiment, any of the methods provided herein relate to depositing the learning application into the content database. In this embodiment, the user depositing the learning application may be registered as a contributor of the deposited learning application, thereby providing a means for associating the deposited learning application with that user. Optionally, the contributed objects are tagged with a contribution parameter. The contribution parameter may identify the contributor who provided the object or may be used in calculating a payment to the contributor when the object is accessed or is withdrawn. In an aspect, contribution parameter is capable of varying over time depending at least in part on the number of times the object is accessed or how the object is incorporated within the object or learning application. For example, popular objects, having a relatively large number of withdrawals may reflect underpayment to the contributor, so that a contribution parameter related to payment is increased as the rate of withdrawal changes. This increase may be passed onto the user/consumer, such as by an increase in registration fee or a fee charged to withdraw the object. In another example, payment may also depend on the total number of objects, particularly objects deposited by other contributors, incorporated into the learning object, instructional object or learning application. To facilitate affordability and accessibility, the per object compensation value can decrease as the total number of incorporated objects increases.

In an aspect, the user provides a payment to access the database, such as a registration payment or a withdrawal payment that depends on a contribution parameter of the withdrawn contribution and/or a user characteristic parameter.

In other embodiments, the compensation value depends on a user characteristic parameter. For example, the user characteristic parameter may reflect the entity status of the user such as individual, commercial, non-profit, governmental organization, non-governmental organization, the field of use of the learning application, or the number of learning applications that will be deployed.

In an aspect, the user provides a payment to access the database. In an aspect, the user is a contributor who provides a payment to become a registered contributor. The payment and related registration permits the registered contributor to access the database, including the ability to deposit objects to the content database.

In an embodiment, the method relates to feedback evaluation of a contributor or developer by users or the system itself. For example, a feedback score may be associated with a registered contributor, wherein the feedback score is determined from the number of withdrawals of the object(s) contributed by said contributor (e.g., system-automated feedback), a rating parameter generated by users accessing said content database, or both. The rating parameter may be a subjective score of one or more of quality, completeness, accuracy or usability of the object by other users, for example.

Provided are methods wherein the content database is user-searchable by a parameter that is associated with a contributor, so that if a user locates an object in the database of particular interest, the user can then search for other objects deposited by the same contributor. Accordingly, in an embodiment the registered contributor is provided with a contributor profile parameter and objects in the database are selected based on the contributor profile parameter that is tagged to objects deposited by the particular contributor. Similarly, the method may further comprise identifying an object of interest for a user in the content database, determining the contributor profile parameter associated with the object of interest and requesting the registered contributor associated with the contributor profile parameter to deposit additional reusable digital objects, learning applications or process applications into the content database. This embodiment is particularly useful for consumers who may themselves not be interested in developing learning applications, but instead would like a developer who may be more familiar or comfortable with the development process to provide the learning application, such as a developer or contributor of an object the consumer has been previously pleased with.

In an aspect, the method further comprises compensating the registered contributor based on the compensation value, such as by providing payment to the contributor. In this manner, a contributor of content to the database is incentivized to continue to provide high-quality and accessible material to the content database because the better the quality and accessibility, the more likely the content (e.g., digital objects) will be used and the contributor compensated.

The registering step optionally further comprises identifying a field of use for the learning application, wherein the compensation value is calculated at least in part based on the field of use. For example, commercial uses of the learning application may warrant a higher compensation value than non-commercial or educational use.

Any of the methods presented herein may further comprise displaying the learning application (such as with an electronic display), printing the learning application to a physical medium, or storing the learning application on a computer-readable digital medium.

In another embodiment, the invention is a method of making a content database for use in making a learning application by providing a content database, registering a user, permitting the user access to the content database, modifying the database content by a contribution of a reusable digital object to the content database from the registered user, and compensating the registered user with an incentive generated when the contributed object is accessed.

In an aspect, the compensating step further comprises registering a second user to provide the second user access to the modified database, wherein the deposited object is accessed by the second user, the registration step comprising payment of a registration fee. At least a portion of the registration fee is provided to the user who contributed the accessed object. In an embodiment, accessed refers to withdrawal of the object.

In an embodiment, the incentive comprises monetary compensation, a positive writer rating, or both. In another embodiment, the content database is made by a plurality of registered contributors.

In an embodiment, any of the processes or methods provided herein relate to a learning application that is an interactive digital multimedia instructional material. In an embodiment, any of the processes or methods of the present invention refer to a user that is a teacher, instructor, manager or a student, such as a user that is a contributor. In an aspect, the processes and methods provided herein are used in an educational or a business environment.

DETAILED DESCRIPTION OF THE INVENTION

Figure 1A:
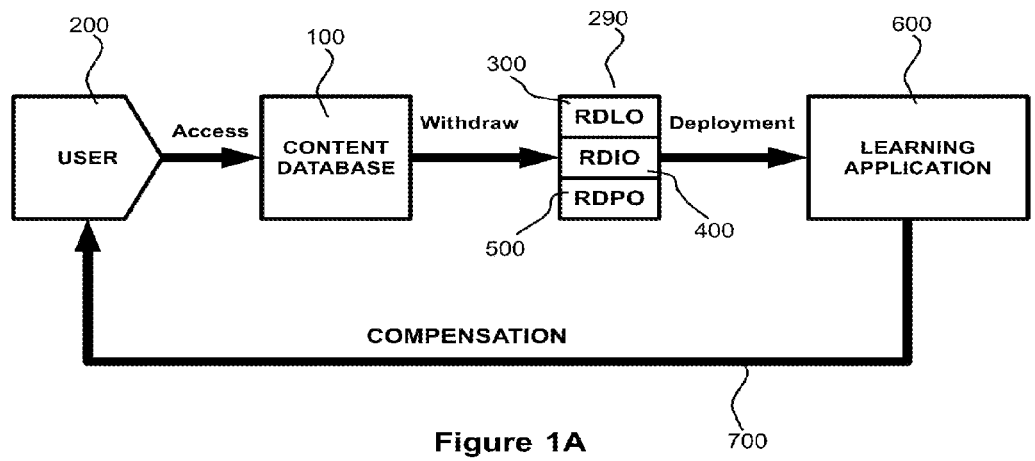
FIG. 1: A. Process flow schematic illustrating a user access of a content database for withdrawal of a digital object and subsequent deployment of a learning application and optional compensation to user for use of the deployed learning application in the form of payment. B. Compensation may flow directly from use of one or more objects in the content database or from a learning application that itself is deposited to the database and/or deployed from the database.

As used herein, "learning application" refers to any product that provides objects in a structured manner to facilitate learning. For example, the product may be a book, an instructional manual, a course document, a curriculum or other tool to facilitate learning such as an organizational structure, system, process tool or program. In general, a learning application is an instructional object that has been deployed from the content database.

"Content database" refers to a plurality of independent digital objects that are organized in a manner to facilitate searching and location by a user. The objects may range from a relatively small amount of material that does not have any associated context (e.g., "learning object") such as an image, or may include larger materials comprising a number of objects that may be incorporated in a manner to provide context to a user (e.g., "instructional object"), and may include a learning application. The database may include any suitable database system known in the art, such as systems described in U.S. Pat. Pub. No. 2004/0205645.

A "reusable digital object" is used broadly herein to refer to any digital content that is useful to a user. Examples include, but are not limited to, any one or more of relatively small pieces of information such as text, images or other multimedia (sound, video) to higher level objects including processes, digital programs for carrying out processes, applications, applets, instructional objects (e.g., objects with context and/or content). "Object" may be a "learning object", "instructional object", "process object" or any combination thereof.

The term "object" is used broadly to refer to searchable items in the content database. The term "learning application" generally refers to materials deployed from the database for use by others. In certain aspects, an object in the database may actually correspond to a learning application that has not been deployed.

"Learning object" refers to any content without context. For example, a learning object may simply be isolated fact(s) or information without context. This context can be supplied by a developer who places the learning object into a desired context, thereby transforming the learning object into an "instructional object." Similarly, when referring to processes, a learning object is a process that is capable of linking content together, but is itself without content. This content can be supplied by a user to transform the learning process object into an instructional process object. A process object may be used to develop a skill set or may be used to perform a task for the user, such as a calculation, for example. "Process skill object" is a specific subset of the term "process object" and refers to a tool that is used to develop a skill set (e.g., a "how-to" tool). Accordingly, "process skill object" refers to any process that is capable of facilitating learning, including software programs that implement "how to" instruction in a field of interest, such as science, the scientific method, organization, classification.

"Process object" refers to an implemental process wherein a user inputs information and the process object performs the process on the input and provides a corresponding output dependent, at least in part, on the input. For example, a dynamic calculator object performs a mathematical operation or transformation on numerical entries; a behavior management object provides a process for the user to follow to facilitate a desired behavioral outcome. "Tool" refers to a software-implemented process for learning, such as learning related to scientific study, taxonomical management or staff management.

"Deposited" refers to objects that are placed into the content database by a user and made available to other users for incorporating into a learning application.

"User" refers to a person or entity that is using any of the systems and methods provided herein. The user may be a contributor, developer or a consumer, depending on the access desired of the content database. For example, a user simply interested in searching and/or withdrawing objects from the content database is referred to as a "consumer". A consumer may be a person or an automated search tool for data mining, for example. Such an automated search tool may be classified as a consumer because the search tool may not deposit anything back into the database, but simply withdraw objects of potential interest. A user wishing to deposit objects to the content database for use by others is referred to as a "contributor". A user wishing both to withdraw objects from the content database and use those objects to develop instructional objects or learning applications is referred herein as a "developer". In an aspect, the developer is an automated search tool. A user that only withdraws objects for deployment to others may be further classified as a "publisher."

"Registered" refers to a process wherein a user is uniquely identified and provided with a registration profile that governs access to the content database. The registration process may optionally include payment by the user.

"Access" refers to providing a user the capability to review the database, such as performing a search of the database to locate objects of potential relevance and interest. In other embodiments, access also refers to selecting and withdrawing an object from the database. In other embodiments, access refers to the use of an object from the content database in the development of a learning application, such as the incorporation of the object into a learning application. Accordingly, access can be a combination of one or more of database searching, selection, withdrawal and use of the withdrawn object. Similarly, access also refers to a user having capability of depositing a digital object to the database including, but not limited to, a learning application, a learning object an instructional object and/or a process object.

"Withdraws" refers to the removal of an object from the content database. As the objects in the content database are "reusable", the removal refers to a copy of the digital object being removed so that the object is capable, in fact, of remaining in the database to be used by others. Optionally, authority access may be provided to permanently remove an object from the database.

The invention may be further understood by the following non-limiting examples. All references cited herein are hereby incorporated by reference to the extent not inconsistent with the disclosure herewith. Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

Figure 1B:
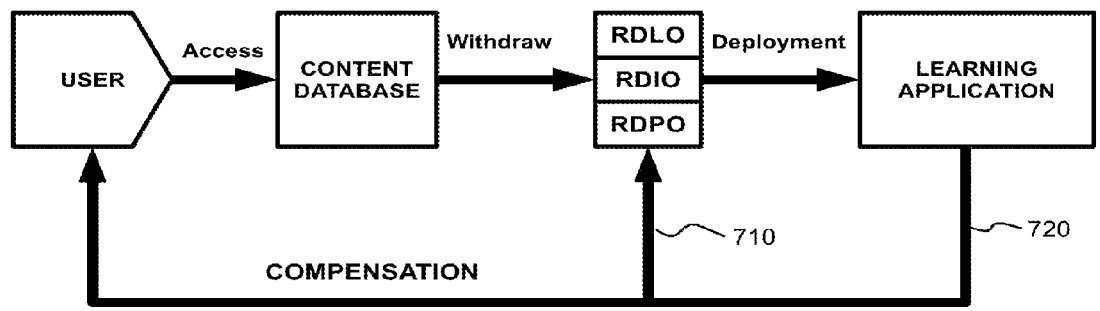

Referring to FIG. 1, provided is a content database 100 that is accessed by a user 200. The content database 100 is a repository of reusable digital objects 290. Depending on the application of interest by user 200, as well as the registration level of user 200, an object 290 within content database 100 is withdrawn. FIG. 1 illustrates that the withdrawn digital object 290 includes, but is not limited to, a reusable digital learning object 300, a reusable digital instructional object 400, or a reusable digital process object 500. The user may use the withdrawn object 290 in an instructional or learning application 600. Compensation 700 optionally flows to a user who accessed and contributed the object to the database that was subsequently withdrawn 290 and incorporated into the learning application 600, such as by a user who withdrew the object, as illustrated in FIG. 1A. FIG. 1B illustrates payment flowing to a user from two streams: (i) payment 710 for withdrawal of the object; and (ii) payment 720 for incorporation or deployment of the object into a learning application. Optionally, the learning application 600 may itself be deposited into the content database 100. Compensation level may depend on the size of the object withdrawn, the subsequent use of the withdrawn object, the popularity of the withdrawn object (e.g., the number of times it is withdrawn), the field of use of the downstream application, and/or whether the learning application deposited back into the database 100.

A user can access the database to withdraw RDLO, RDPO and/or RDIO for use and integration into instructional and learning environments, such as into a learning application for use in those instructional learning environments. For example, a user can access the database to withdraw a RDLO that is then used to create a RDIO. Optionally, the RDIO is deposited back into the database and made available to other users for use and integration into instructional and learning environments. In this manner, the database is grown organically, wherein objects such as instructional objects are developed directly from the database.

Figure 2:
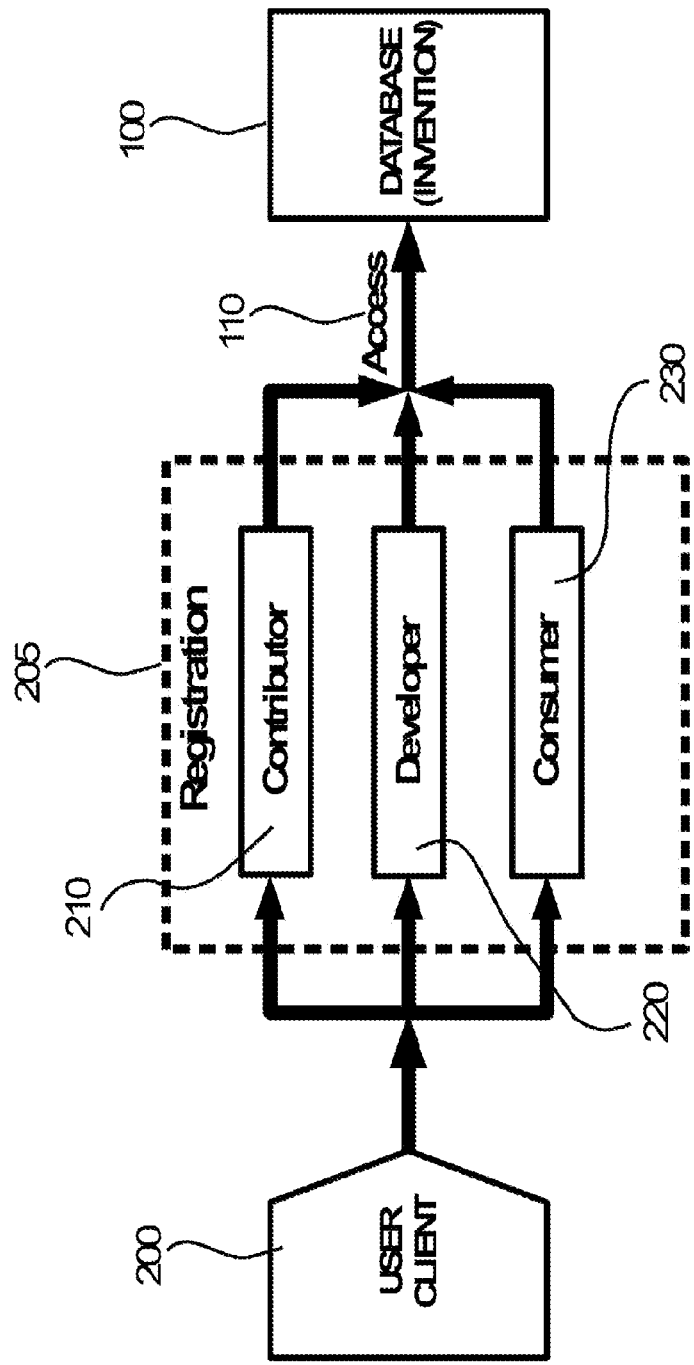
FIG. 2: Schematic indicating one example where a user may register as one or more of a consumer, a contributor, or a developer. Content database access parameters are defined by registration type.

FIG. 2 is a schematic illustrating different registration levels 205 for a user 200, and in this example shows a user that may register under three user profile registrations: a consumer 230; a contributor 210; a developer 220. In addition, various combinations thereof are permitted. Depending on the registration type of a user, different access 110 is provided to database 100. Content database access parameters 110 are defined by registration type 205 so that a consumer may, for example, have access to only look (e.g., search) at the content database and/or withdraw materials, but may not have permission to modify the database, such as contribute to the database or modify existing objects in the database. In contrast, a contributor may have the capability to deposit materials into the content database, but may not necessarily be authorized to withdraw or use objects. A developer may have authorization to search, withdraw and deposit content to the database, such as a learning object, instructional object, process object, or a learning application. Different registration profiles permit a combination of any of the registration and related access levels disclosed herein.

Figure 3A:
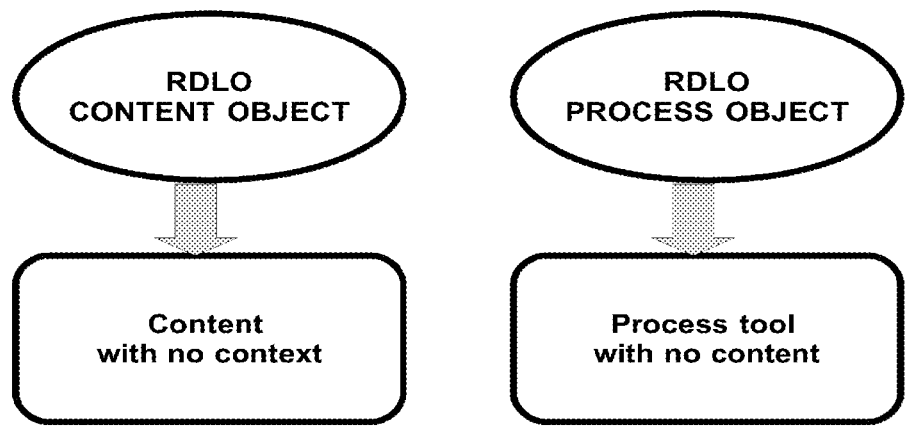
FIG. 3: A. Schematic illustration of reusable digital learning object (RDLO) content (left panel) and process (RDPO) content (right panel) in a content database. B. Schematic illustration of reusable digital instructional object (RDIO) that may be in a content database or be ready for deployment as a learning application in an instructional setting. C. Schematic illustration of addressing dynamic curriculum development and delivery.
Figure 3B:
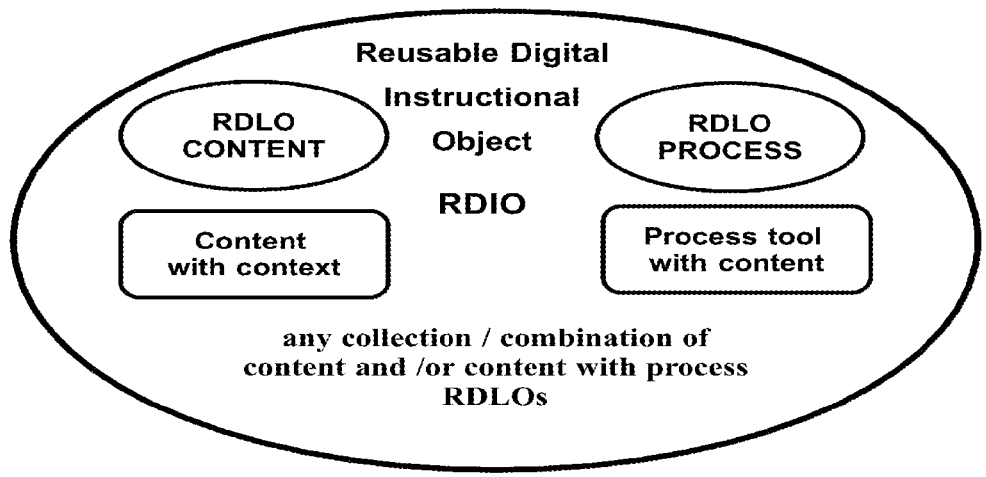

Reusable digital object is used broadly to refer to content in a database that is searchable and of potential interest to a user. For example, the digital object is optionally a reusable digital learning object (RDLO) as illustrated in FIG. 3. The term "learning object" has been defined and described by many people and organizations in a wide variety. In a broad sense, a learning object is defined as content outside of any context or a process tool capable of linking content together but that is itself without content (see FIG. 3A). In contrast, an instructional object is a RDLO having content within a context or a RDLO process tool capable of linking content together to address a specific organizational/learner outcomes/goals and that itself has content (see FIG. 3B). More specific examples of RDLO include: educational object, learning object, content object, training components, nuggets, chunks, assets, component information object, knowledge object, learning resource, media object, raw media element, reusable information object (Cisco Systems), reusable learning object, unit of learning, unit of study, shareable content object and other objects as recognized in the field of knowledge management information.

Figure 3C:
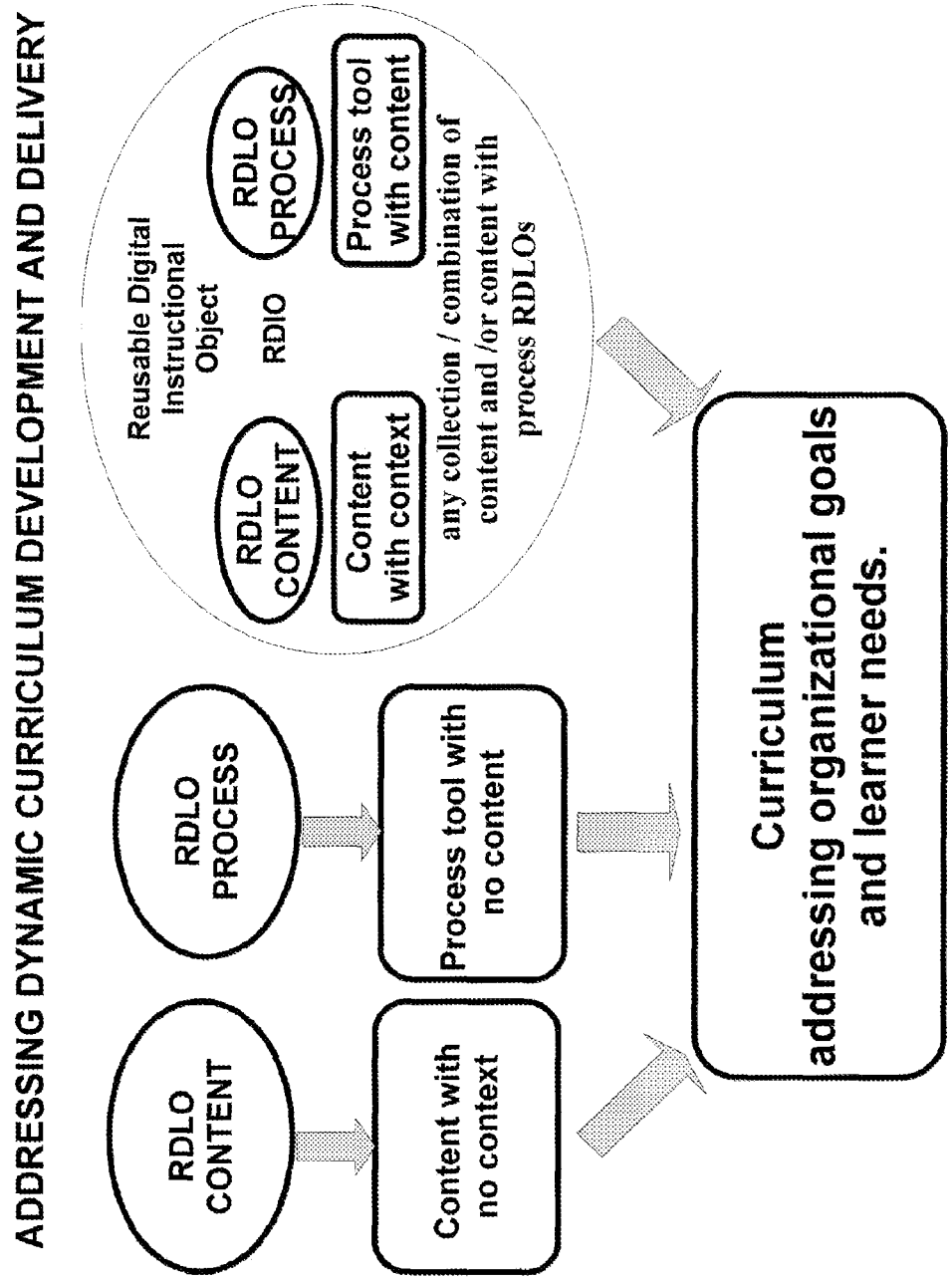

FIG. 3C illustrates one problem solved by the methods disclosed herein. The problem is that current instructional environments face significant constraints when developing, delivering, and managing instructional curriculum/learning systems. Constraints needed to be overcome in the deployment of learning applications such as instructional curriculum or learning systems, include lack of dynamic environments wherein concurrent evaluation and modification is not possible. Accordingly, there is a need for a comprehensive and appropriately structured database of RDLO content and RDLO processes (see FIG. 3C (top right portion)) to form a RDIO. The RDIO is then employed to generate the learning application, including instructional curriculum/learning systems. Accordingly, with this structure, various requirements for a successful 21$^{st}$ Century Learning Environment are achieved, including (1) learning objects integrated with curriculum to create dynamic environments that require concurrent evaluation and modification; (2) flexibility to meet the dynamic needs of the respective instructional/learning environment; (3) address a diverse set of instructional and learner components; (4) develop effective and measurable prescribed outcomes; (5) utilize embedded measurability to determine its need for modification. To meet these various needs, provided herein is a customizable "learning object/curriculum" development and delivery "software application." Specifically, the organization/instructor implementing the learning application is provided with the appropriate tools for developing and delivering sustainable organization-specific instruction through a database-linked graphic user interface that allows: (1) Accessibility to tagged/categorized and current instructional objects/curriculum tools; (2) necessary flexibility for evaluation-to-modification/re-implementation; (3) accessibility to effective outcome measurability tools; and (4) deliverability to diverse organizational/instructional learner environments.

Other examples of reusable digital objects useful for incorporation into a learning application include, but are not limited to, individual images, flash animations, lesson plans, software training, curriculum textbooks, training manuals, deployment strategies, webinars, interactive training and professional development opportunities. In another aspect, the content database contains objects that are actually useful to a user. Those objects that are not of interest to potential users are correspondingly identified as such when the objects fall below a minimum access number as defined by an administrator of the database. In this manner, the content database is self-filtering to ensure only useful objects remain with the database.

Figure 4:
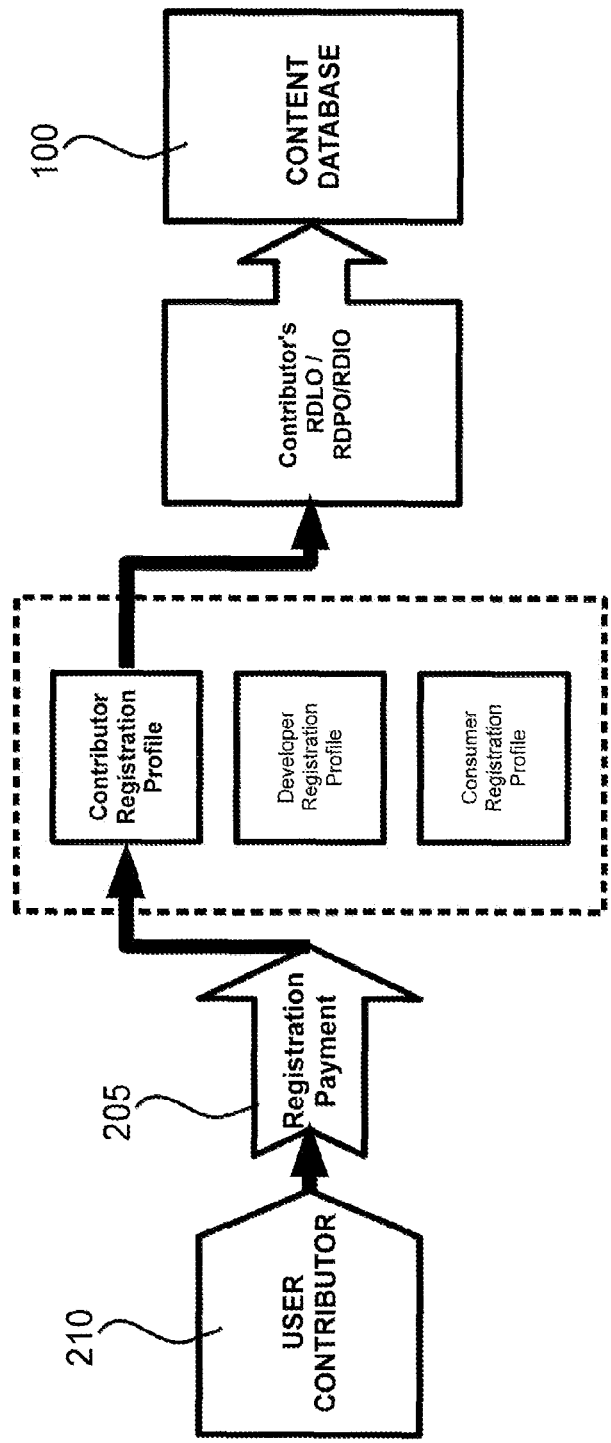
FIG. 4: Summary of profile and navigation for a user that is a contributor.
Figure 5:
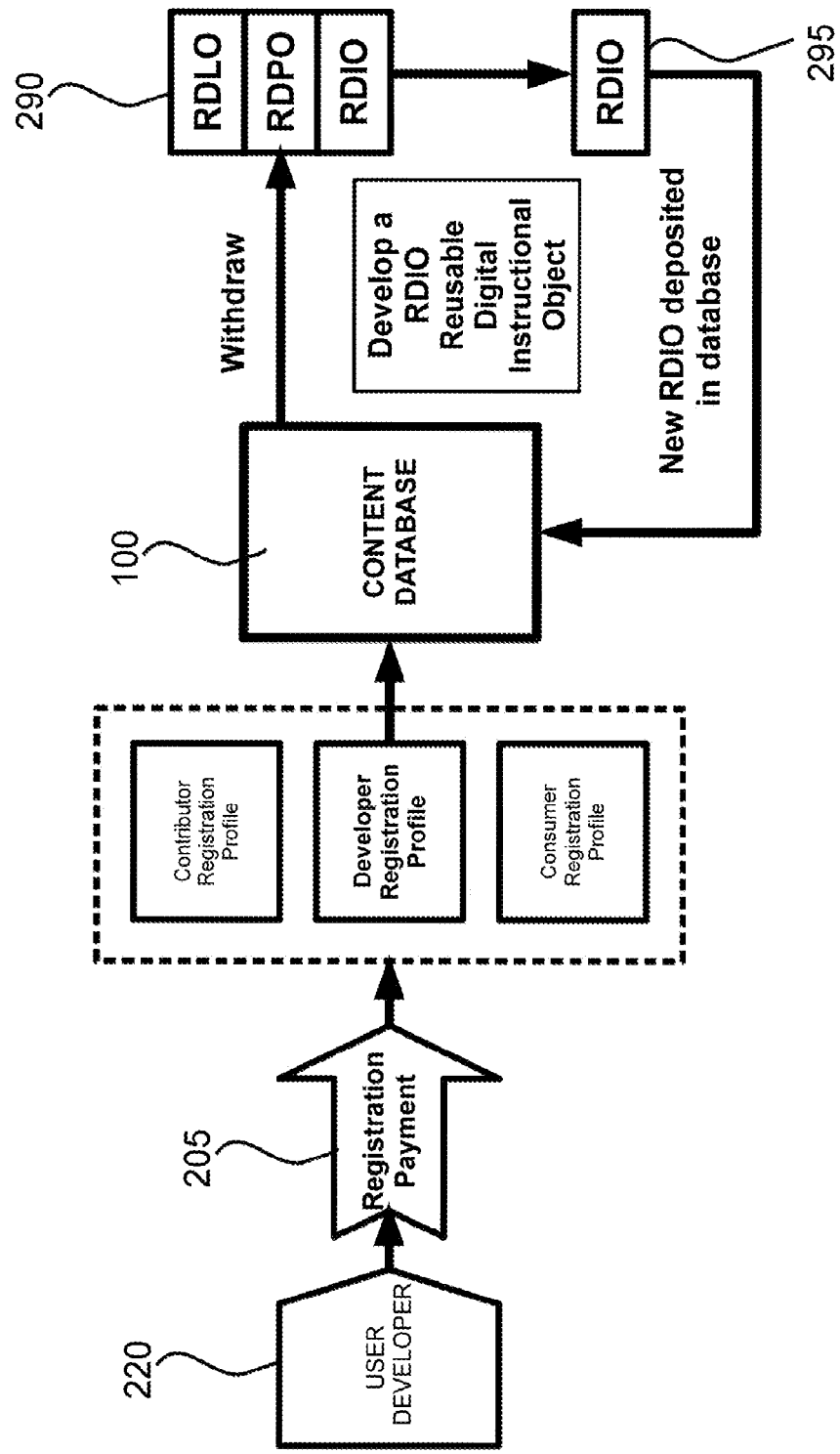
FIG. 5: Summary of profile and navigation for a user that is a developer.
Figure 6:
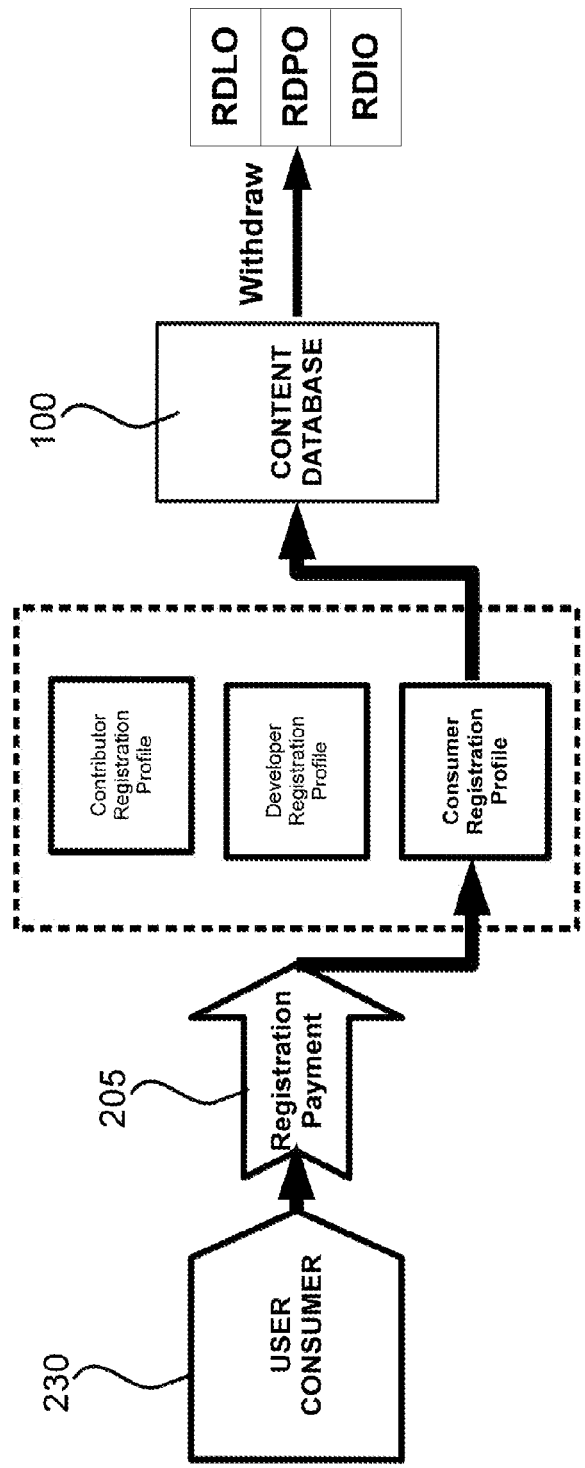
FIG. 6: Summary of profile and navigation for a user that is a consumer.

FIGS. 4-6 are flow-charts for a user that is a contributor, developer and consumer, respectively. Referring to FIG. 4, a user performs a registration step 205 that identifies the user as a contributor 210 and provides the user a contributor registration profile. The registration profile provides access to content database 100, including the ability for the contributor to contribute to the database 100, such as a contribution that is a learning object, process object or an instructional object. The registration is optionally on a per access basis or can be for a period of time, such as annually, for example. The contributor registration profile optionally contains one or more unique identifiers so that the user contributor is associated with the object contributed to the database. For example, the contributed object may be tagged. In an aspect, the profile may include one or more of a name, place, organization or other identifier to uniquely associate the contributed object with a particular user that is an individual or an organization, for example. Optionally, the user is tagged to provide a capability of viewing object and/or users in a tag cloud GUI, for example. Consumers of content contained in the content database may provide feedback related to the contributed content. Optionally, this feedback is used to generate information of use to the contributor or other users. Optionally, feedback from consumers to contributors is used so that consumers can view all contributors' objects, such as by generating a tag cloud GUI. For example, a consumer can then make requests of specific contributors, such as a request for additional learning objects for deposit into the content database or for modification of learning objects already in the content database.

FIG. 5 refers to a user that is a developer. Registration step 205 provides a user with access parameters for a developer 220. A developer registration profile permits database access for withdrawal of objects for further development and optionally, contribution of materials developed therefrom back into content database 100. The type of registration 205 can inform whether the developer is required to submit developed material, such as a RDIO into the database and/or deploy the RDIO. "Deploy" refers to use of the developed material in a context that is outside of the content database, such as for sale or use by a third-party who is not a registered user of the system provided herein. Requiring the developer to deposit the developed RDIO 295, as shown in FIG. 5, assists in more fully and rapidly developing content database 100, further increasing the value of the system to any number of users. In an aspect where the developer 220 withdraws an object from content database 100 that was contributed by a different user, such as a contributor 210 of FIG. 4, payment may flow from developer 220 to contributor 210, as well as to developer 220 from any users who access the object, such as a RDIO deposited by developer 220.

An embodiment where the user is a consumer 230 is provided in FIG. 6. In this embodiment, registration 205 as a consumer provides access to content database for search and optionally withdrawal of objects from content database, such as RDLO, RDPO and RDIO. Different consumer registration profiles may inform registration requirements, such as depending whether the consumer is an individual or an entity, such as a non-profit, governmental or commercial entity, for example. The registration requirement, may further be informed by the field of use for the withdrawn material, such as a learning application for commercial sale or for educational use (e.g., within a single classroom, a school, a school district, or across multiple school districts).

Figure 7:
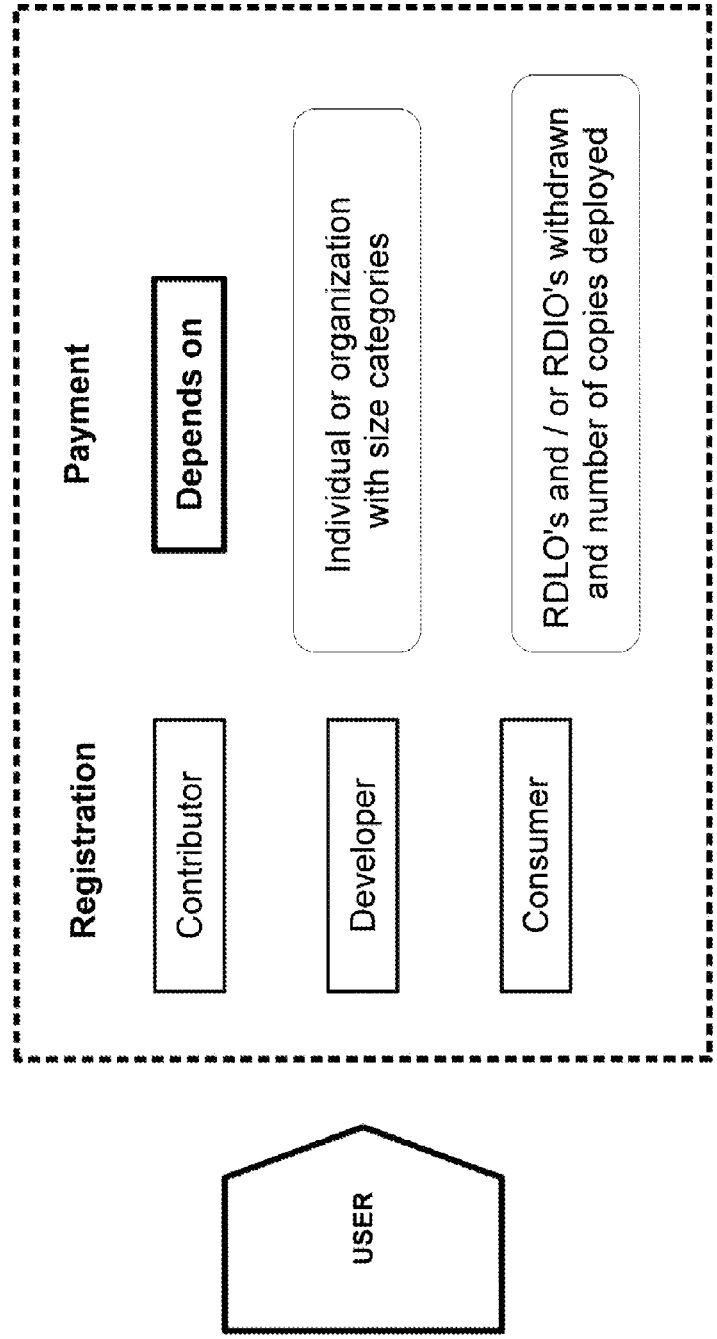
FIG. 7: Examples of impact of registration type and payment parameters on compensation.

FIG. 7 provides examples of how a registration profile can inform a registration requirement, such as payment. For example, payment level can vary and depend on characteristics such as individual, organization, commercial or educational, size of organization, relevant end-consumer market, number of RDLO's/RDIO's withdrawn and number of copies to be deployed.

Figure 8:
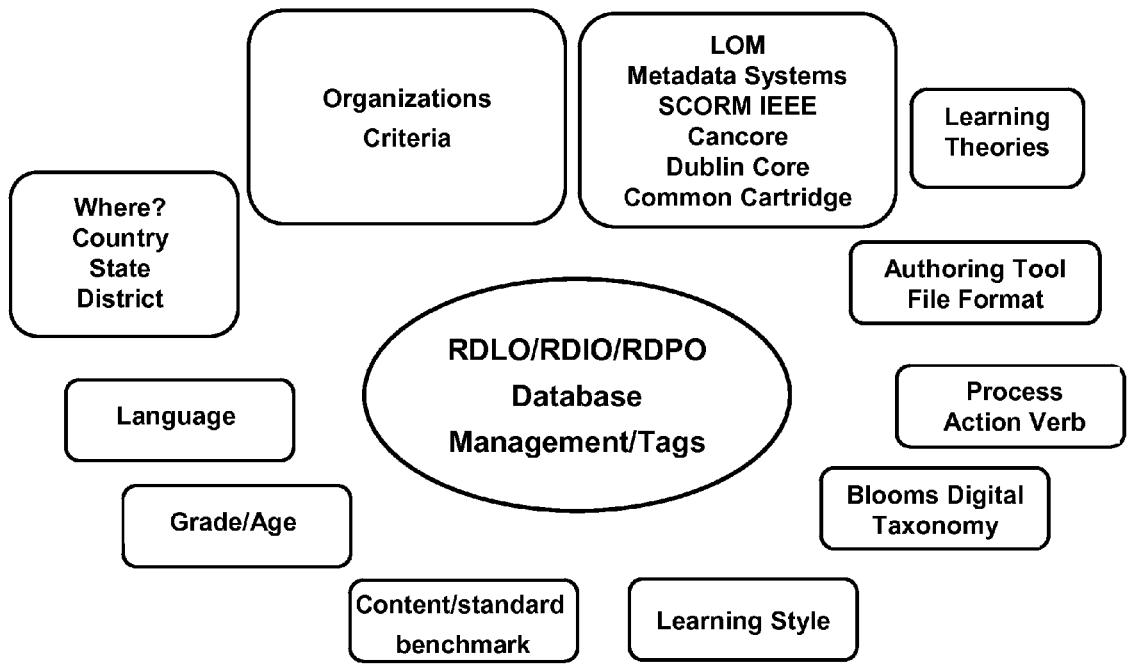
FIG. 8: Examples of RDLO, RDIA and/or RDPO database management/tags for content organization and searching of objects in the content database.

Examples of organizing or tagging of content within content database is provided in FIG. 8. In particular, content database may include tiers of products depending on the complexity, size, and/or granularity of the RDLO, for example. Tagging the RDLO permits improved accessibility and searchability by users. Accordingly, systems of tagging may be recommended, but not necessarily dictated, by any of the systems provided herein. There is a built-in incentive for contributors and/or developers to ensure the content they deposit to the content database is accurately and comprehensively tagged, as such tagging will facilitate access of the deposited material by other users with a corresponding compensation benefit to the user who deposited the withdrawn content.

Examples of potential organizational and/or tagging schemes include, but are not limited to, Bloom's Digital Taxonomy of Learning, standard alignment, curriculum development, curriculum deployment and management. In an embodiment, an interface can provide suggestions to help facilitate the tagging progress when the user is depositing material to the content database, such as drop-down menu, for example.

Figure 9:
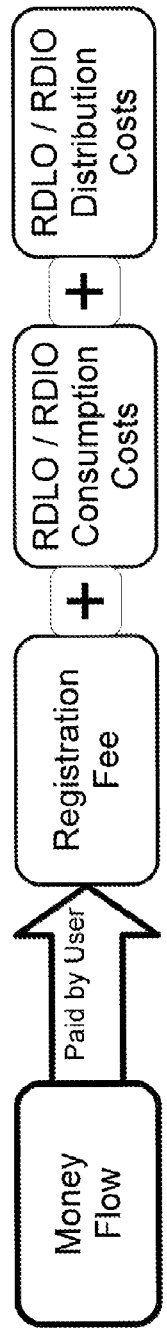
FIG. 9: Summary of compensation in the form of monetary payment to support content database, learning application development and distribution thereof.

Various factors may be used to determine percentage or proportion of payment to the contributor, developer or the administrator/owner for any of the systems presented herein. Various monetary inputs are available including registration fees, consumption costs and distribution costs, as summarized in FIG. 9. Systems provided herein are useful for various entity types including commercial, non-profit, governmental or non-governmental organizations. Payment flow and magnitudes may be varied, as desired, by the system owner or administrator to facilitate their desired goals.

Figure 10:
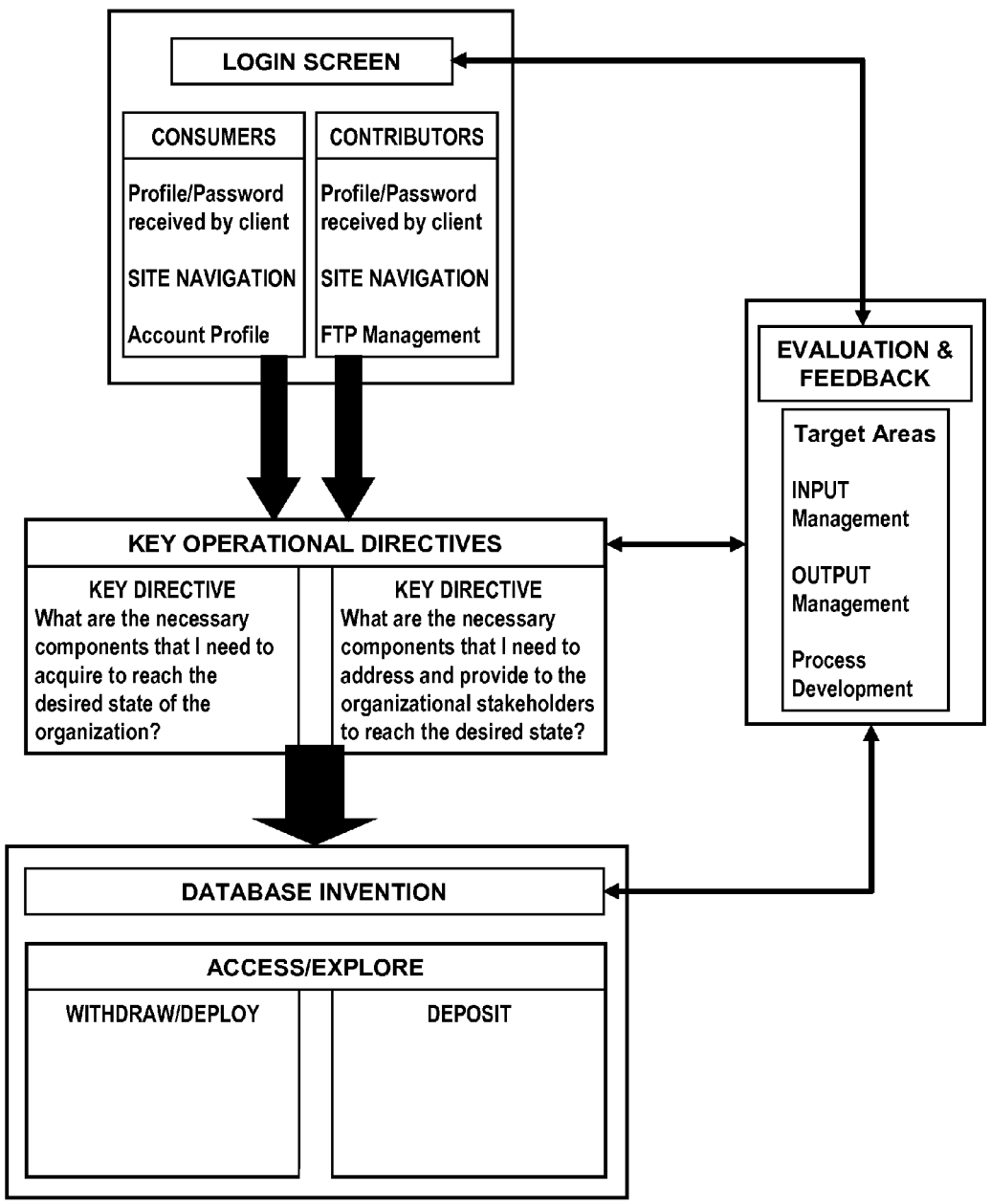
FIG. 10: Structural pedagogy for an exemplary webpage interface for use with any of the methods provided herein.

The processes and methods described herein are optionally implemented on a computer system, including on a network such as the internet. The user may access the system via a graphical user interface, such as on a web page or a web site. The user may login to access the system and navigate to a number of different functions including, but not limited to: registration; organization; database contribution (e.g., contributor or developer registration profile); publishing, licensing and deployment (e.g., consumer registration profile); payment and feedback (e.g., publisher/consumer). The system can further recognize different organizational systems including, but not limited to: Executive administration/database; Publishing, Licensing and Deployment; Payment. For example, administrative access may be provided to manage the contribution process and/or the publishing, licensing, deployment and payment process. FIG. 10 provides a schematic illustration of a GUI and functional attributes therein in as well as the various evaluation and feedback loops. The various operation directives, evaluation and feedback can be structured to encourage database evolution, development and usability.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition, in a description of elements of a device or of a method step, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The definitions provided herein are to clarify their specific use in the context of the invention.

We claim:

1. A method of making a learning application, said method comprising:
    providing a content database comprising reusable digital objects, wherein at least a portion of said reusable digital objects are deposited to said content database by a registered contributor and said portion is identified as contributed by said registered contributor;
    registering a user as a developer user, thereby providing said developer user with access to said content database, wherein said developer user withdraws one or more of said reusable digital objects from said database, wherein at least one reusable digital object was deposited by said registered contributor;
    forming said withdrawn reusable digital objects into a learning application;
    depositing said learning application into the content database for use by another user;
    calculating a compensation value for said registered contributor; and
    compensating said registered contributor based on said calculated compensation value
    wherein at least one of said withdrawn one or more reusable digital objects comprises a learning application that the developer user modifies.

2. The method of claim 1 wherein said reusable digital objects further comprises a learning object, an instructional object, a process object, or a combination thereof.

3. The method of claim 1, wherein said registered contributor is also a developer.

4. The method of claim 1, wherein said reusable digital objects are selected from the group consisting of an image; a flash animation; a textual entry; a lesson plan; a training manual or portion thereof; a textbook or portion thereof; and a combination thereof.

5. The method of claim 1, wherein said reusable digital objects comprise a process object selected from the group consisting of: a dynamic calculator object; a behavior management object; a spell check object; a learning tool; a scientific implementation tool; a taxonomical management tool; a staff management tool; and a curriculum learning theory template.

6. The method of claim 1, wherein said learning application is selected from the group consisting of a publication; a textbook; a training manual; a course curriculum; a lesson plan; a webinar; an interactive digital document; a reusable digital instruction object; and a process object.

7. The method of claim 6, wherein said learning application is displayed on a physical medium selected from the group consisting of: paper; and an electronic display.

8. The method of claim 1, further comprising:
    identifying a withdrawal number for an individual reusable digital object from said reusable digital objects based on the number of times said individual reusable digital object is withdrawn; and
    removing said individual reusable digital object from said content database if said withdrawal number is less than a minimum withdrawal number.

9. The method of claim 1, further comprising:
    registering said developer user as a contributor of said deposited learning application.

10. The method of claim 1, further comprising tagging said at least a portion of reusable digital objects deposited by said registered contributor with a contribution parameter.

11. The method of claim 10, wherein said contribution parameter is capable of varying over time depending at least in part on the number of times said at least a portion of reusable digital objects deposited by said registered contributor is accessed.

12. The method of claim 1, wherein said developer user provides a payment to access said database.

13. The method of claim 12, wherein said payment amount depends on a contribution parameter of said withdrawn reusable digital objects.

14. The method of claim 1, wherein said compensation value depends on a user characteristic parameter.

15. The method of claim 1, wherein said registered contributor provides a payment to become a registered contributor.

16. The method of claim 15, wherein said registered contributor is capable of accessing said database.

17. The method of claim 15, wherein a feedback score is associated with said registered contributor, said feedback score determined from a number of withdrawals of a reusable digital object contributed by said registered contributor, a rating parameter generated by users accessing said content database, or both.

18. The method of claim 1, further comprising:
    providing said registered contributor with a contributor profile parameter that is tagged to a deposited reusable digital object by said registered contributor; and
    selecting reusable digital objects in said content database based on said contributor profile parameter.

19. The method of claim 18 further comprising:
    identifying an object of interest for said user developer in said content database;
    determining said contributor profile parameter associated with said object of interest; and
    requesting the registered contributor associated with said contributor profile parameter to deposit additional reusable digital objects, learning applications or process applications.

20. The method of claim 1, wherein said registering step further comprises identifying a field of use for said learning application, wherein said compensation value is calculated at least in part based on said field of use.

21. The method of claim 1, wherein said learning application is displayed.

22. The method of claim 1, further comprising printing said learning application to a physical medium.

23. The method of claim 1, further comprising storing said learning application on a digital medium.

24. A method of making a content database for use in making a learning application, said method comprising:
    providing a content database;
    registering a user as a registered user;
    permitting said registered user access to said content database;
    modifying said content database by a contribution of a reusable digital object to said content database from said registered user;

registering a second user as a developer user, wherein the developer user is not said registered user;

wherein said developer user accesses and modifies at least said reusable digital object and forms a learning application from said accessed and modified reusable digital object and compensating said registered user with an incentive generated when said contributed reusable digital object is accessed by said developer user.

25. The method of claim 24 wherein said compensating step further comprises:

obtaining a payment of a registration fee from the second user; and providing said registered user who contributed said withdrawn reusable digital object to said content database with at least a portion of said registration fee.

26. The method of claim 24, wherein said incentive comprises monetary compensation, a positive writer rating, or both.

27. The method of claim 24, wherein said content database is made by a plurality of registered users who contribute to the content database.

28. The method of claim 24 wherein the learning application is an interactive digital multimedia instructional material further comprising the step of customizing the learning application for a learner.

29. The method of claim 24 wherein the registered user or the developer user is a teacher or a student.

30. The method of claim 24, further comprising the step of depositing said learning application into the content database for use by another user.

31. The method of claim 24, wherein the learning application is not deposited into said content database and said incentive to the registered user is increased compared to the incentive when the learning application is deposited into said content database.

* * * * *